T. GOLDE.
HINGED VEHICLE HOOD.
APPLICATION FILED AUG. 4, 1911.

1,034,902.

Patented Aug. 6, 1912.
4 SHEETS—SHEET 1.

T. GOLDE.
HINGED VEHICLE HOOD.
APPLICATION FILED AUG. 4, 1911.

1,034,902.

Patented Aug. 6, 1912.
4 SHEETS—SHEET 2.

T. GOLDE.
HINGED VEHICLE HOOD.
APPLICATION FILED AUG. 4, 1911.

1,034,902.

Patented Aug. 6, 1912.
4 SHEETS—SHEET 3.

T. GOLDE.
HINGED VEHICLE HOOD.
APPLICATION FILED AUG. 4, 1911.

1,034,902.

Patented Aug. 6, 1912.
4 SHEETS—SHEET 4.

UNITED STATES PATENT OFFICE.

TRAUGOTT GOLDE, OF GERA, GERMANY.

HINGED VEHICLE-HOOD.

1,034,902.  Specification of Letters Patent.  Patented Aug. 6, 1912.

Application filed August 4, 1911. Serial No. 642,256.

*To all whom it may concern:*

Be it known that I, TRAUGOTT GOLDE, a subject of the Prince of Reuss, Younger Line, residing at Gera, Reuss, Germany, have invented a new and Improved Hinged Hood for Vehicles, of which the following is a specification.

This invention relates to a hinged hood for automobiles and other vehicles, which may be readily folded and is braced in a novel and efficient manner.

Figure 1:
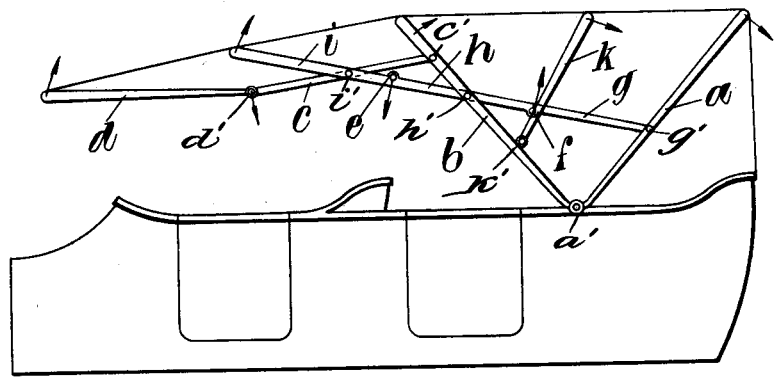
Figure 2:
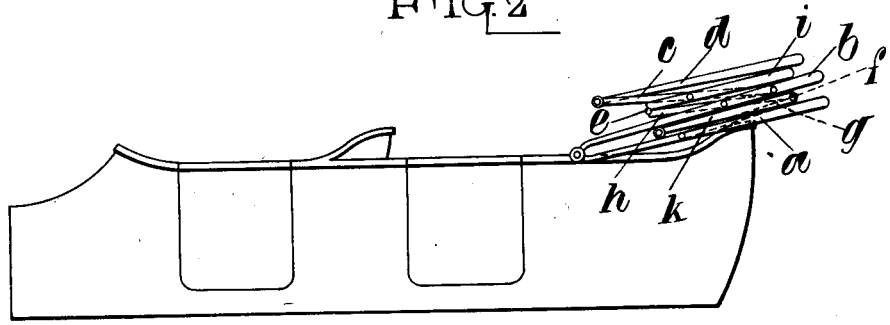
Figure 3:
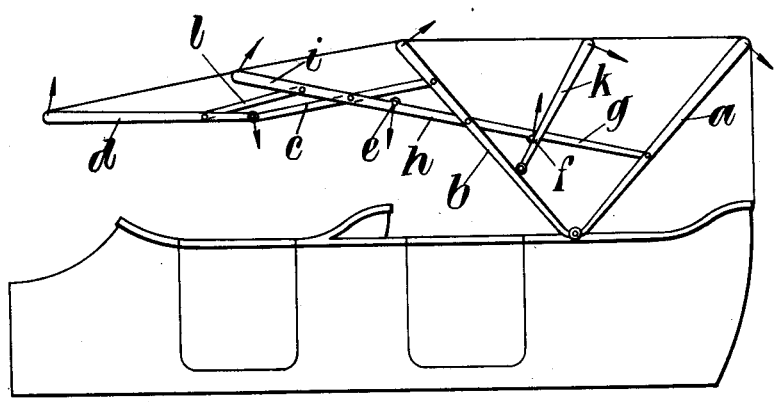
Figure 4:
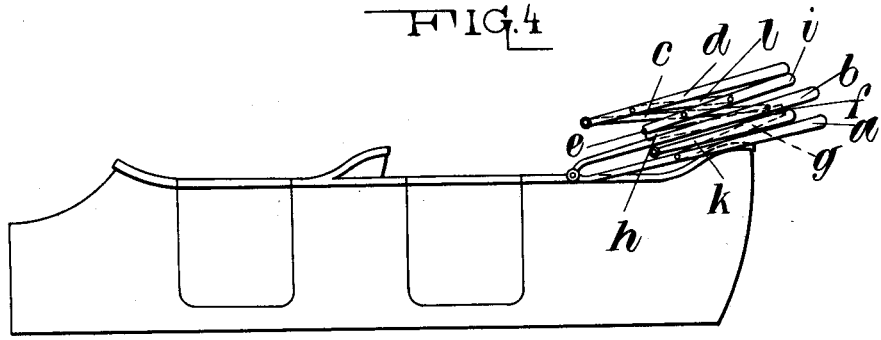
Figure 5:
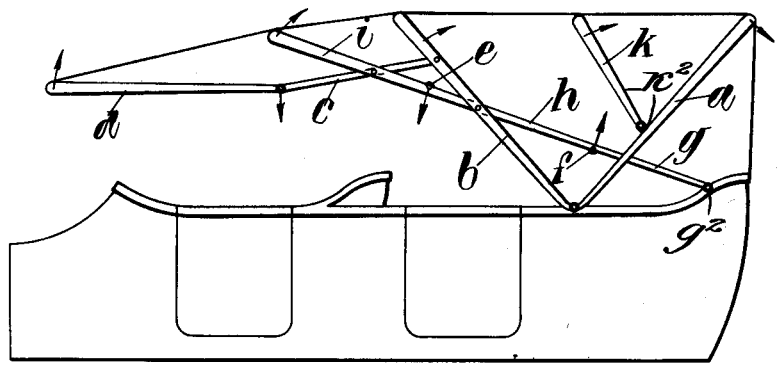
Figure 6:
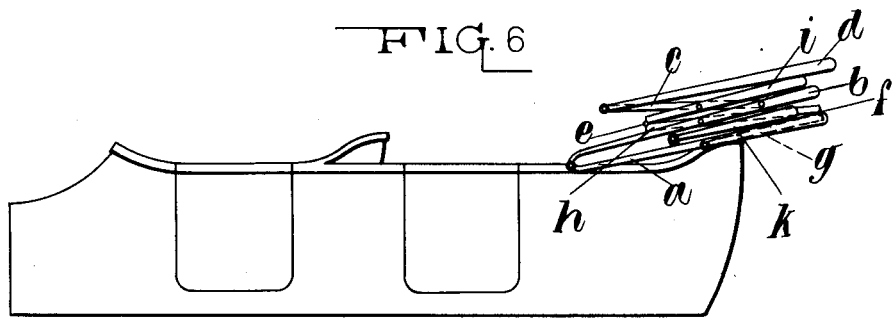
Figure 7:
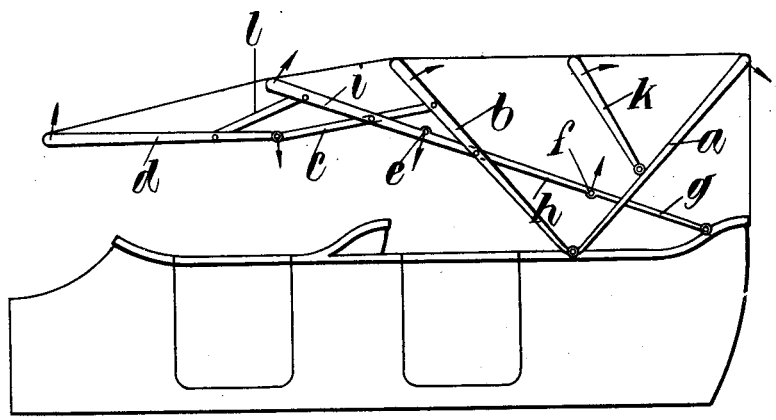

In the accompanying drawing: Figure 1 is a side view of a vehicle hood embodying my invention, showing it open; Fig. 2 a similar view showing it folded; Fig. 3 a side view of a modification of the hood showing it open; Fig. 4 a side view of Fig. 3 showing it closed; Fig. 5 a side view of a further modification of the hood showing it open; Fig. 6 a side view of Fig. 5 showing it closed; Fig. 7 a side view of a still further modification of the hood showing it open, and Fig. 8 a side view of Fig. 7 showing it closed.

The hood comprises a pair of rear bows $a$ and $b$, pivoted to the vehicle body at $a'$. Across the foremost bow $b$, there extends the front member $h$ of an obliquely arranged articulated brace $h$, $g$ the rear member $g$ of which is pivoted to the front member $h$ at a point $f$ intermediate bows $a$, $b$. Rear member $g$ is furthermore pivoted to rear bow $a$ at $g'$, while front member $h$ is pivoted to front bow $b$ at $h'$ and extends a distance beyond said bow. To the forward end of member $h$ there is further pivoted at $e$, an intermediate bow $i$ adapted to be alined with brace $g$, $h$ and to extend in a like oblique direction. To bow $b$ is pivoted at a point $c'$ located above pivot $h'$, the rear end of a two arm lever $c$ that crosses intermediate bow $i$ and is pivoted thereto at $i'$. The outrigger bow $d$ is pivoted to the front end of lever $c$ at $d'$. A third rear bow $k$ is arranged between bows $a$, $b$ and is pivoted to bow $b$ at $k'$.

It will be seen that by the construction described the top is effectively braced from end to end and that it may readily be folded as shown in Fig. 2.

In Figs. 3 and 4, an additional prop $l$ connects oblique bow $i$ with bow $d$ in front of lever $c$ and in approximate parallelism therewith.

In Figs. 5 and 6, the rear member $g$ of the oblique brace $h$, $g$ is pivoted to the vehicle body at $g^2$ in lieu of being pivoted to bow $a$. The supplemental bow $k$ is pivoted to said rear bow at $k^2$ in lieu of being pivoted to bow $b$.

Figure 8:
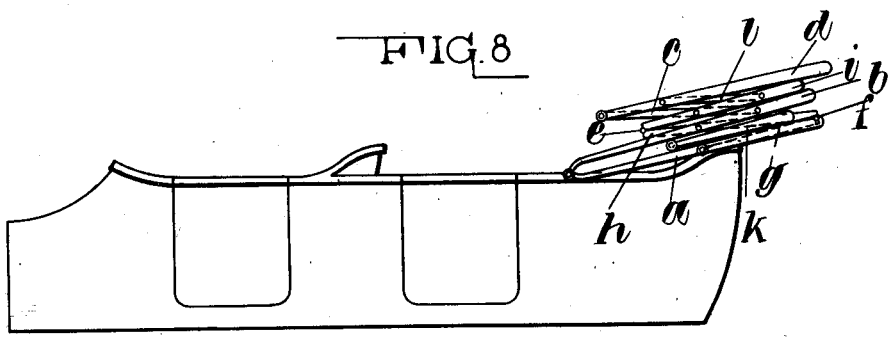

In Figs. 7 and 8 the construction is the same as in Figs. 5 and 6, excepting that the prop $l$ shown in Figs. 3 and 4 is embodied therein.

I claim:

A vehicle hood comprising a rear bow, an articulated diagonal brace pivoted to the same and turning on a fulcrum back of said bow, said brace extending a distance forward of said bow, an intermediate bow pivoted to the forward end of the brace, a lever pivoted to the rear bow above the brace and also to the intermediate bow, and an outrigger bow carried by the lever.

In testimony whereof I affix my signature in the presence of two witnesses.

TRAUGOTT GOLDE.

Witnesses:
  J. STEPHAN,
  CHARLES NEUER.